(12) United States Patent
Das et al.

(10) Patent No.: US 8,176,350 B2
(45) Date of Patent: May 8, 2012

(54) POWERING COMPUTER SYSTEM COMMUNICATION UNIT ACCORDING TO WHETHER PROGRAM EXECUTING AND/OR WEBPAGE ACCESSED IS USER SELECTED

(75) Inventors: Kumarbrata Das, Yongin-si (KR); Soo-hyun Yoo, Incheon (KR)

(73) Assignee: Samsung Electronics Co., Ltd, Suwon-si (KR)

(*) Notice: Subject to any disclaimer, the term of this patent is extended or adjusted under 35 U.S.C. 154(b) by 1044 days.

(21) Appl. No.: 11/952,190

(22) Filed: Dec. 7, 2007

(65) Prior Publication Data

US 2008/0189566 A1 Aug. 7, 2008

(30) Foreign Application Priority Data

Feb. 7, 2007 (KR) .................. 10-2007-0012913

(51) Int. Cl.
*G06F 1/32* (2006.01)
(52) U.S. Cl. ........................ 713/324; 455/574
(58) Field of Classification Search .................. 713/324; 455/574
See application file for complete search history.

(56) References Cited

U.S. PATENT DOCUMENTS

| | | | |
|---|---|---|---|
| 6,029,249 A | 2/2000 | Atkinson | |
| 7,565,562 B2* | 7/2009 | Chary | 713/324 |
| 7,765,419 B2* | 7/2010 | Fuccello | 713/324 |
| 7,853,298 B2* | 12/2010 | Kakumaru et al. | 455/574 |
| 2005/0076253 A1* | 4/2005 | Lu | 713/320 |
| 2006/0053311 A1 | 3/2006 | Chary | |
| 2006/0140140 A1 | 6/2006 | Fuccello | |

FOREIGN PATENT DOCUMENTS

| | | |
|---|---|---|
| CN | 1604012 A | 4/2005 |
| KR | 1998-083601 | 12/1998 |
| KR | 2001-96575 | 11/2001 |
| KR | 2004-6786 | 1/2004 |

OTHER PUBLICATIONS

Chinese Office Action mailed by the SIPO on Jan. 29, 2012.

\* cited by examiner

*Primary Examiner* — Albert Wang
(74) *Attorney, Agent, or Firm* — Jefferson IP Law, LLP

(57) ABSTRACT

A computer system. The computer system includes a communication unit to receive power to perform communication with an external apparatus; and a controller to check whether at least one program to make the communication unit perform the communication is executing, and controls the communication unit to decrease consumption of power by the communication unit if the executing program is not a pre-set program.

20 Claims, 6 Drawing Sheets

POWERING COMPUTER SYSTEM COMMUNICATION UNIT ACCORDING TO WHETHER PROGRAM EXECUTING AND/OR WEBPAGE ACCESSED IS USER SELECTED

CROSS-REFERENCE TO RELATED APPLICATION

This application claims the benefit of Korean Patent Application No. 2007-12913, filed in the Korean Intellectual Property Office on Feb. 7, 2007, the disclosure of which is incorporated herein by reference.

BACKGROUND OF THE INVENTION

1. Field of the Invention

Aspects of the present invention relate to a computer system and control method thereof and, more particularly, to a computer system and control method thereof that receives an operating electric power to perform communication.

2. Description of the Related Art

In general, it is very important to decrease electric power consumption in computer systems, such as desktops and notebooks. Especially in portable computer systems such as notebooks, where power is limited by a battery of restricted capacity, reduction of power consumption is a subject of still more importance.

In many cases, the computer system performs communication (hereinafter referred to as "network communication") with an external apparatus, such as a web server, through the network. To perform the network communication, the computer system is provided with a communication unit, such as a network card or network chip. The communication unit of the computer system receives power and consumes the power depending on the communication operation being performed (if any).

In conventional technology, the communication unit is selectively disabled according to whether a network cable is connected to the computer system or not, thus decreasing power consumption generated by the communication operation of the communication unit. However, according to the conventional technology, if the communication unit is to be used, for example, if the user wants to use a communication function such as e-mail or others known in the art, the disconnected network cable has to be connected to the computer system each time. In addition, after finishing the communication function, the network cable has to be separated from the computer system.

Accordingly such a process causes much inconvenience to the user, and components of a connecting part may be damaged when the network cable is connected to or disconnected from the computer system.

SUMMARY OF THE INVENTION

Aspects of the present invention provide a computer system and control method thereof that can improve user convenience while decreasing the power required for communication.

Another aspect of the present invention is to provide a computer system and control method thereof where damage on a component can be prevented while decreasing of the power required for communication.

Still another aspect of the present invention is to provide a computer system and control method thereof that can satisfy the user's preference while decreasing the electric power required for communication.

According to an aspect of the present invention, a computer system is provided. The computer system includes a communication unit to receive power to perform communication with an external apparatus; and a controller to check whether at least one program to make the communication unit perform the communication is executing, and to control the communication unit to decrease consumption of power by the communication unit if the executing program is not a pre-set program.

According to another aspect of the invention, the controller decreases the consumption of the power by shutting a supply of power to the communication unit.

According to another aspect of the invention, the controller decreases the consumption of the operating electric power by controlling the communication unit to stop the communication operation.

According to another aspect of the invention, the computer system further includes a user input unit to receive a user's command with regard to setting the pre-set program, wherein the controller determines whether the executing program is the pre-set program according to the user's command.

According to another aspect of the invention, the computer system further includes a displaying unit to display a graphical user interface (GUI) with regard to the setting of the program, wherein the controller controls the displaying unit to display at least one item corresponding to at least one program and a select box to select one of the at least one programs according to the user's command on the GUI.

According to another aspect of the invention, the computer system further includes a battery unit to supply the power to the communication unit.

According to another aspect of the invention, the controller controls the communication unit to decrease the consumption of power by the communication unit if the at least one program is not executing.

According to another aspect of the present invention, a control method of a computer system including a communication unit to receive power to perform communication with an external apparatus is provided. The control method includes checking whether at least one program to make the communication unit perform the communication is executing based on a pre-set program; and controlling the communication unit to decrease consumption of the power by the communication unit if the executing program is not the pre-set program.

According to another aspect of the invention, controlling the communication unit includes decreasing the consumption of the operating electric power by shutting off the supply of power to the communication unit.

According to another aspect of the invention, controlling the communication unit includes decreasing the consumption of the power by controlling the communication unit to stop communication.

According to another aspect of the invention, the control method of the computer system further includes determining whether the executing program is the pre-set program set by receiving a user's command with regard to setting the pre-set program.

According to another aspect of the invention, determining the pre-set program includes displaying a graphical user interface (GUI) having at least one item corresponding to at least one program and a select box to selecting one of the at least one programs according to the user's command.

According to another aspect of the invention, the control method further includes supplying electric power to the communication unit via a battery unit.

According to another aspect of the invention, controlling the communication unit includes controlling the communication unit to decrease the consumption of power by the communication unit if the at least one program is not executing.

According to another aspect of the present invention, a computer system is provided. The computer system includes a communication unit to receive power to perform communication with an external apparatus; and a controller to check whether at least one web page is transmitted according to the communication performed by the communication unit, and to control the communication unit to decrease consumption power by the communication unit if the transmitted web page is not a pre-set web page.

According to another aspect of the present invention, a control method of a computer system including a communication unit to receive power to perform communication with an external apparatus is provided. The control method including: checking whether at least one web page is transmitted according to a communication performed by the communication unit based on a pre-set web page; and controlling the communication unit to decrease consumption power by the communication unit if the transmitted web page is not the pre-set web page.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
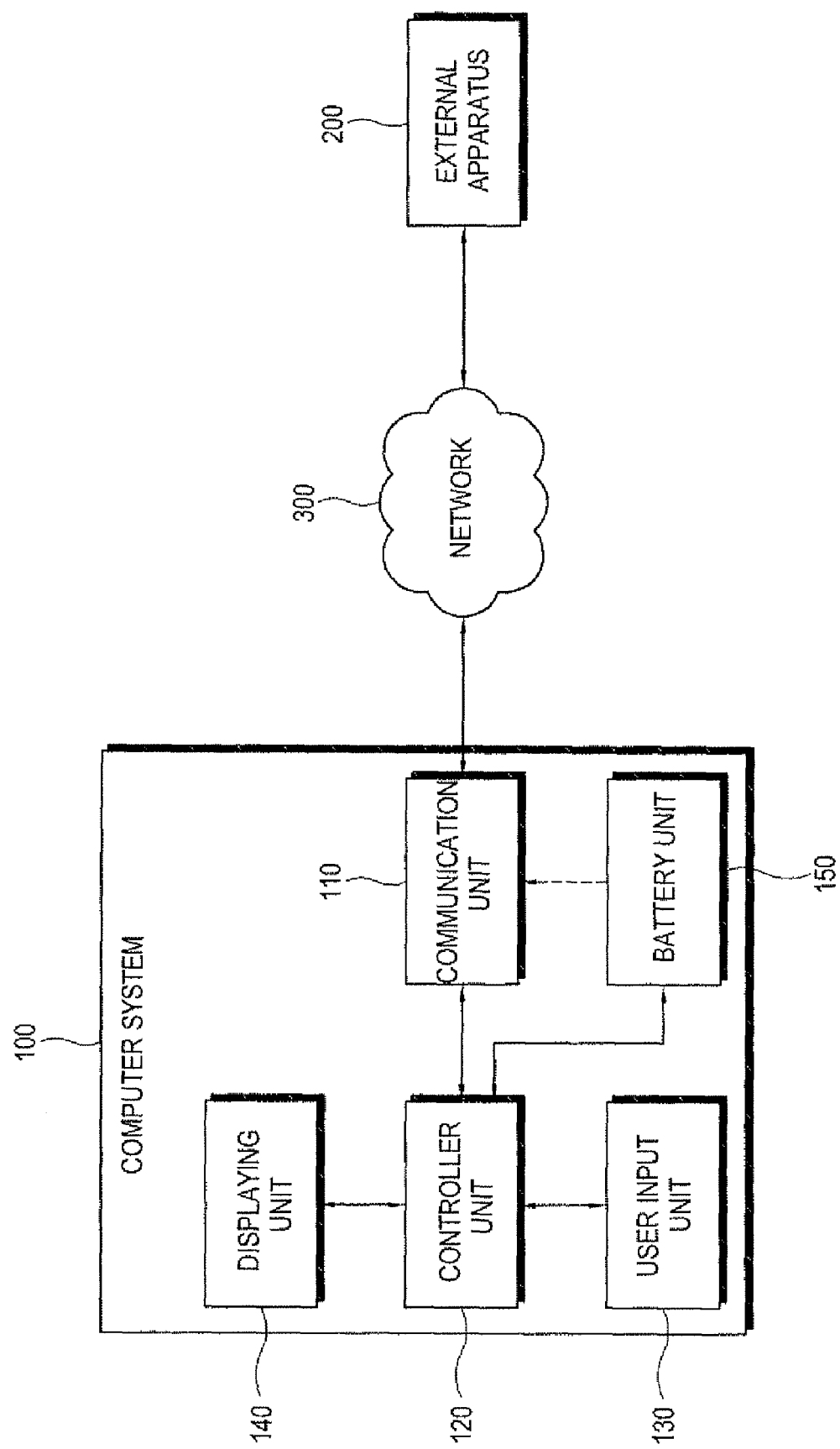
FIG. 1 is a block diagram describing constitution of a computer system according to an embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 2:
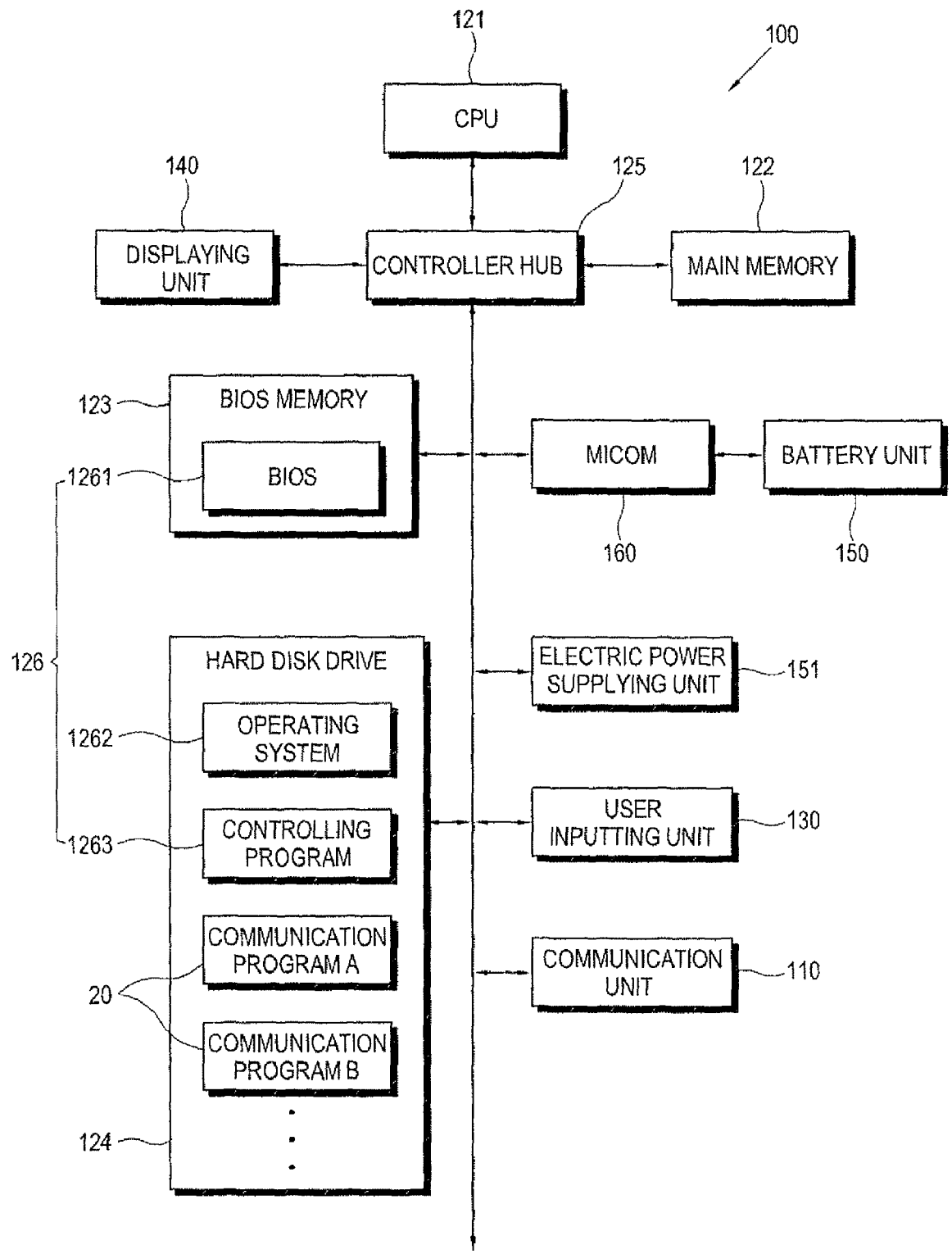
FIG. 2 is a block diagram describing in detail the constitution of the computer system according to an embodiment of the present invention.

FIG. 1 is a block diagram of a computer system 100 according to an embodiment of the present invention. FIG. 2 is a block diagram describing in detail the constitution of the computer system according to an embodiment of the present invention. The computer system 100 of FIGS. 1 and 2 may be a desktop computer, a notebook computer, a personal entertainment device, a personal digital assistant, a mobile phone, a set-top box, a home entertainment device, or the like. As shown in FIG. 1, the computer system 100 performs communication with an external apparatus 200 through network 300.

The network 300 may be a wireless network or a wired network, and may be embodied by a local area network (LAN), metropolitan area network, wide area network, the Internet, or other types of networks. The computer system 100 communicates with the external apparatus 200 through the network 300. If the network 300 is the Internet, the external apparatus 200 may be a web server providing web pages.

As shown in FIG. 1, the computer system 100 includes a communication unit 110 and a controller 120. The communication unit 110 performs communication with the external apparatus 200 through the network 300. The communication unit 110 may be a network card or network chip.

The communication unit 110 receives power to perform communication operations. As shown in FIG. 2, the computer system 100 may further include an electric power supplying unit 151. The electric power supplying unit 151 supplies power to components of the computer system 100, including the communication unit 110. The electric power supplying unit 151 may transform commonly used alternating current electric power received from the outside into the power for the communication unit 110 and other components of the computer system 100. For simplicity of description, a power supplying path to the communication unit 110 is not shown in FIG. 2.

As shown in FIGS. 1 and 2, the computer system 100 may further include a battery unit 150. The battery unit 150 has a predetermined battery capacity to charge electric power and is charged by the power supplied from the electric power supplying unit 151. The battery unit 150 is an auxiliary power source to assist the electric power supplying unit 151 and may also supply the power to the communication unit 110. The computer system 100, as shown in FIG. 2, may further include a micom 160 controlling the charging of the battery unit 150.

The electric power supplying unit 151 and the battery unit 150 may selectively supply the power to the communication unit 110 according to the control of the controller 120. For example, if the power is supplied from the outside, the controller 120 may control the power to be supplied from the electric power supplying unit 151. If the power is not supplied from the outside, the controller 120 may control the power to be supplied from the battery unit 150.

The controller 120 may execute a program (hereinafter referred to as a "communication program") for the communication unit 110 to perform the communication operation. The communication unit 110 performs a corresponding communication operation according to the execution of the communication program. For example, the communication program may be "Internet Explorer" of Microsoft Corporation. The communication program may be executed according to the user's command. The controller 120 may execute a plurality of communication programs.

The communication program allowing the communication unit 110 to maintain communicating operation is set beforehand (hereinafter referred to as a "pre-set communication program"). The controller 120 checks whether the executed communication program is the pre-set program. If the executed communication program is not the pre-set program, the controller 120 controls the communication unit 110 so as to decrease the consumption of power by the communication unit 110.

If the operation of the communication unit 110 is set not to be necessary, excess consumption of power due to the communication unit 110 can be prevented. The user does not need to physically connect or disconnect the network cable and excess consumption of power due to the communication unit 110 is automatically decreased according to whether the operation of the communication unit 110 is necessary or not, thus enhancing user convenience and preventing damage to components of the computer system 100.

The controller 120 may shut off the supply of power from the electric power supplying unit 151 or the battery unit 150 to the communication unit 110, thus decreasing the consumption of power in the communication unit 110.

In another embodiment, the controller 120 may decrease the consumption of the operating electric power by controlling the communication unit 110 to stop the communication operation. If the communication unit 110 stops the communication operation, power consumption level of the communication unit 110 is lowered to a minimum value. The communication unit 110 may have control signal inputting pins (not shown) for the control of the communication operation.

The controller 120 may execute the pre-set communication program to control the communication unit 110 to receive a web page from the external apparatus 200. The web page to which the communication unit 110 is allowed to maintain the communication operation is set beforehand (hereinafter referred to as the "pre-set web page"). In this case, the controller unit 120 checks whether the received web page is the pre-set web page. If the received web page is not the pre-set web page, the controller 120 may control the communication unit 110 to decrease the consumption of the power by the communication unit 110.

Referring to FIG. 1, the computer system 100 may further include a user inputting unit 130 that receives the user's command to set the pre-set communication program and the pre-set web page. The controller 120 may determine the pre-set communication program and the pre-set web page according to the user's command inputted through the user inputting unit 130. The user inputting unit 130 may be a keyboard, a mouse, a trackpad, a clickwheel, a microphone, or other device capable of receiving user input. The standard of judgment about whether to decrease the consumption of power by the communication unit 110 may be based on the user's preference.

Figure 3:
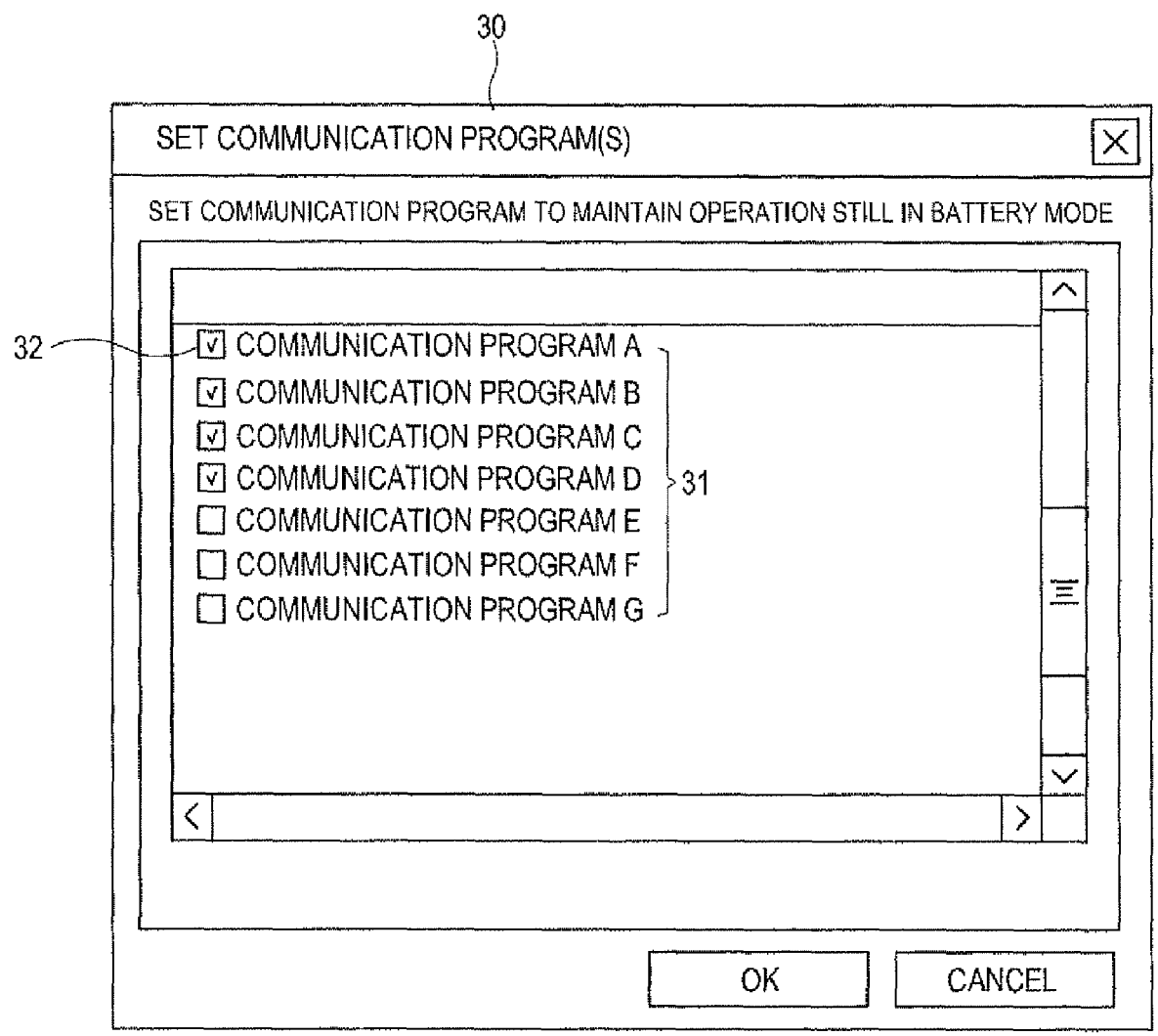
FIG. 3 shows an embodiment of graphic user interface (GUI) according to an embodiment of the present invention.

As shown in FIG. 1, the computer system 100 may further include a displaying unit 140 that displays a graphical user interface (GUI) 30, shown in FIG. 3, for setting the pre-set communication program and the pre-set web page. The controller 120 controls the displaying unit 140 to display, via the GUI 30, items corresponding to the communication programs and the web pages, and items for selecting the communication program(s) and the web page to be set according to the user's command.

FIG. 3 shows the GUI 30 according to an embodiment of the present invention. The GUI 30 includes an item 31 of the communication program and a select box 32 for selecting the pre-set communication program according to the user's command. The controller 120 checks the executable communication program(s) and has the corresponding items 31 displayed via the display unit 140 as the items 31. The controller 120 may save the result of selecting the items 31 according to the user's command in a predetermined memory.

A GUI for setting the pre-set web page may be similar to the GUI 30 for setting the communication program shown in FIG. 3. The operation of the controller 120 for setting the web page may also be similar to the operation of the controller 120 for setting the communication program. The settings of the communication program and the web page may be based on the GUI 30, which is visually familiar and easy to operate, thus still more enhancing the user's convenience.

The controller 120 checks the operating state of the communication program. If no communication program is executing, the controller 120 may control the communication unit 110 to decrease the consumption of the power by the communication unit 110. If the operation of the communication unit 110 is not necessary, the consumption of power due to the communication unit 110 may be prevented, thus still further decreasing the consumption of power by the computer system 100.

The controller 120 may be embodied by a combination of hardware and software (hereinafter referred to as "computer program"). As shown in FIG. 2, the controller 120 may include as hardware a central processing unit (CPU) 121, a main memory 122, a basic input/output system memory (BIOS) 123, a hard disk drive 124 and a controller hub 125.

The main memory 122 may be embodied by a random access memory (RAM) as a volatile memory, and the BIOS memory 123 may be embodied by a read-only memory (RAM) as a non-volatile memory. The hard disk drive 124 may be embodied by a magnetic type or a flash memory type as a non-volatile memory. The controller hub 125 interfaces data transmission among the main memory 122, the BIOS memory 123, and the hard disk drive 124. The controller hub 125 may include a northbridge (not shown) or a memory controller hub (not shown) for high speed data transmission, and a southbridge (not shown) or an I/O controller hub (ICH) (not shown) for low speed data transmission. The various configurations described herein are not limiting; the computer system 100 according to other aspects of the invention may be configured differently.

The controller 120 may include a basic input/output system (BIOS) 1261, an operating system 1262 and a controlling program 1263. The BIOS 1261 is stored in the BIOS memory 123. The operating system 1262 and the controlling program 1263 may be stored in the hard disk drive 124.

A computer program 126 includes a series of codes that the CPU 121 is able to execute. The whole or some part of the computer program 126 is loaded in the main memory 122 while executing. The CPU 121 reads out and executes the codes of the computer program 126 loaded in the main memory 122, thus performing the function of the computer program 126.

The BIOS 1261 is programmed to perform booting of the computer system 100 when the computer system 100 is powered on. When booted, the operating system 1262 is loaded in the main memory 122. The BIOS 1261 is programmed to recognize and control the hardware constituting the computer system 100, for example, the hardware constituting the communication unit 110.

The operating system 1262 is programmed to manage resources of the hardware and the software of the computer system 100. The functions of the operating system 1262 include execution control of programs, such as the communication program, and other control known in the art, such as allocation of the main memory 122, file management, and device input/output control. The operating system 1262 may be, for example, Microsoft Windows, Linux, or Mac OS X.

The controlling program 1263 is an application program executed by the support of the operating system 1262. The controlling program 1263 is programmed to monitor execution status of the communication program, to control the operation of the communication unit 110 according to the monitoring result, and to perform other functions.

As shown in FIG. 2, the communication program a and the communication program b 20, corresponding to the items 31 of the FIG. 3 may also be stored in the hard disk drive 124, and may be loaded in the main memory 122 and executed by the CPU 121.

Figure 4:
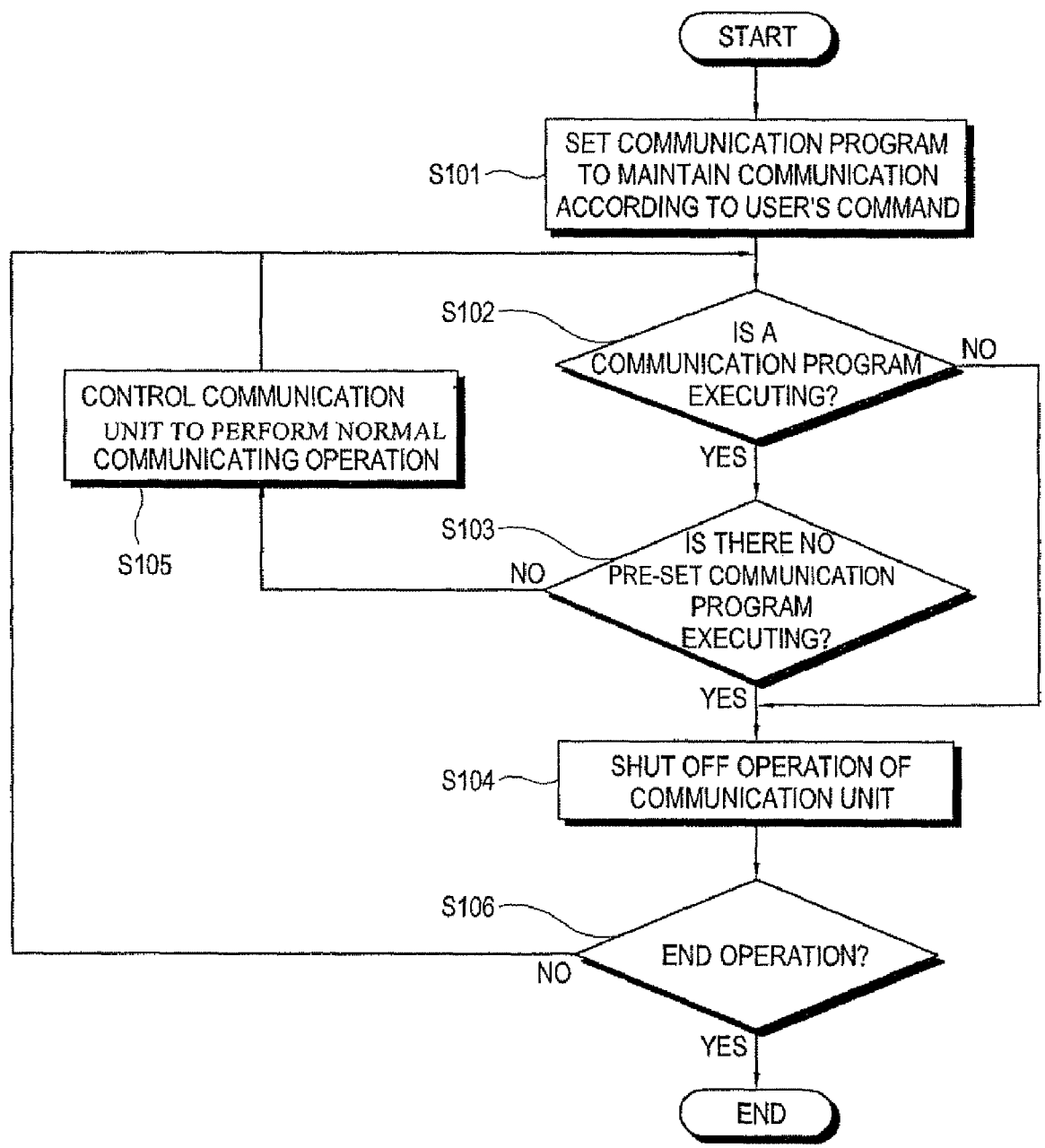
FIGS. 4 to 6 are flow diagrams describing operation process of the computer system according to an embodiment of the present invention.
Figure 5:
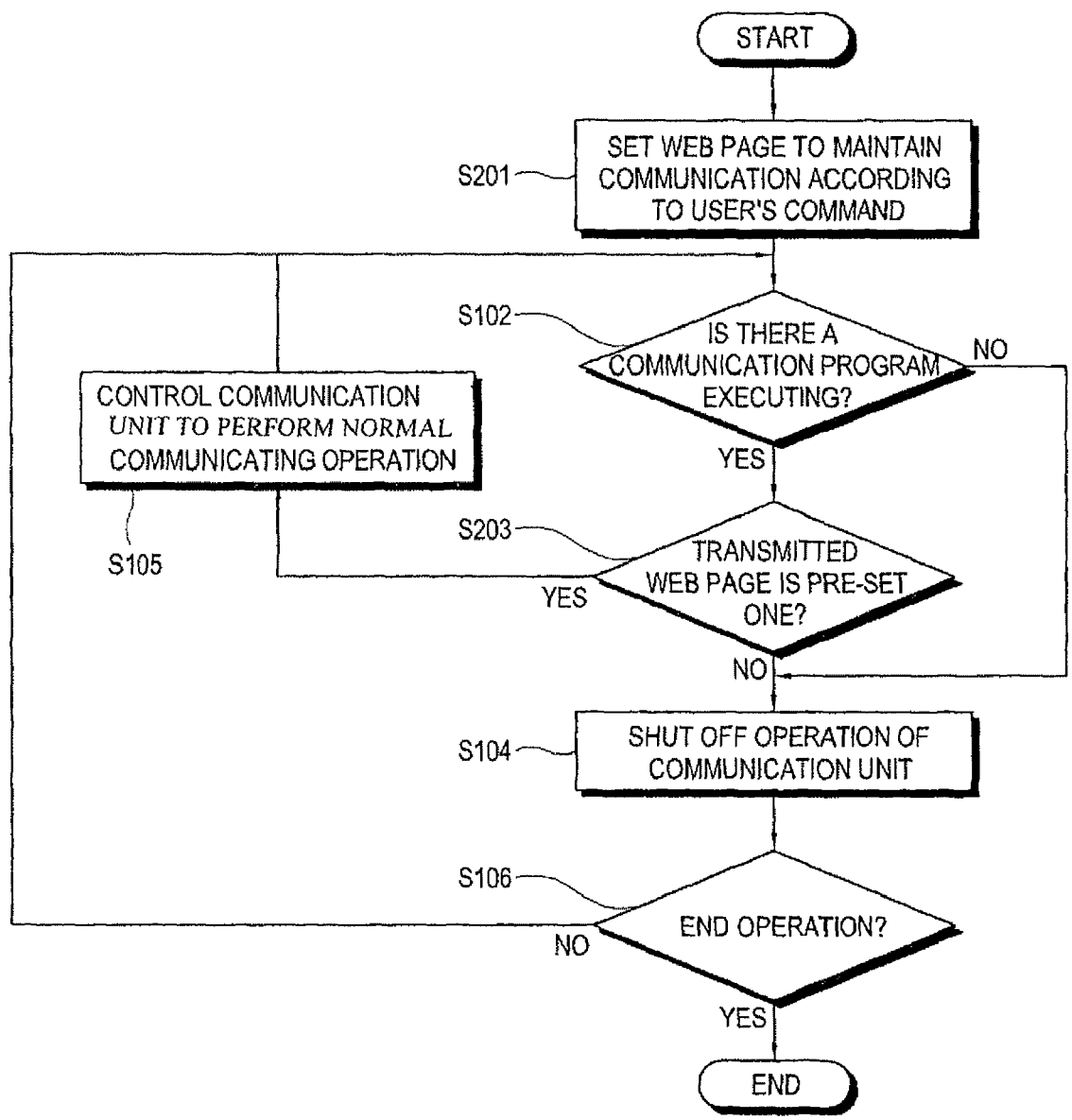
Figure 6:
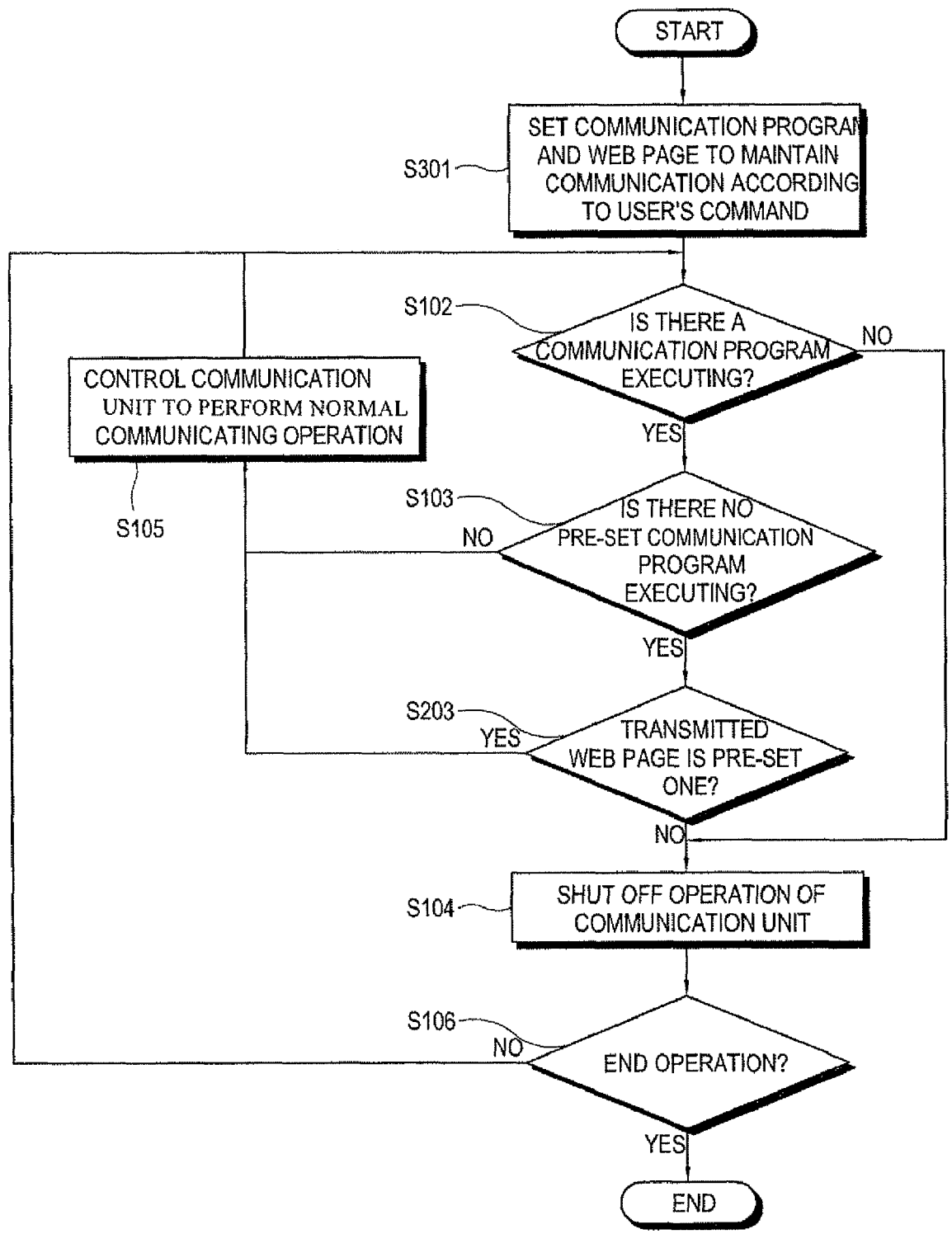

FIGS. 4 to 6 are diagrams describing the operating process of the controller 120 according to an embodiment of the present invention. Referring to FIG. 4, the controller 120 may set the pre-set communication program by which the communication unit 110 maintains the communicating operation, while operating according to the user's command inputted through the user inputting unit 130 at operation S101.

According to another embodiment of operation S101, as shown in FIG. 5, the controller 120 may set the pre-set web site where the communication unit 110 is to maintain the communicating operation according to the user's command at operation S201, or, as shown in FIG. 6, the controller 120 may set both the pre-set communication program and the pre-set web site at operation S301.

At operations S101, S201 or S301, shown in FIGS. 4, 5, and 6, respectively, the controller 120 may display the GUI regarding the setting of the pre-set communication program and/or the pre-set web page on the displaying unit 140. The controller 120 checks if a communication program is executing at operation S102. If no communication program is executing, the controller 120 shuts off the operation of the communication unit 110 so as to decrease the consumption of power at operation S104 as shown in FIGS. 4, 5, and 6.

If a computer program is executing, at operation S103 the controller 120 checks whether the executing communication program is the pre-set communication program set at operation S101. If at least one communication program of the executing communication programs is the pre-set communication program set at operation S101, the controller 120 controls the communication unit 110 to perform the communicating operation normally at operation S105. However, if none of the executing communication programs was the pre-set communication program set at operation S101, operation S104 may be performed as shown in FIG. 4.

According to another embodiment of the invention, if none of the executing communication programs is the pre-set communication programs set at operation S301, the controller 120 checks whether the web page transmitted from the external apparatus 200 is the pre-set web page or not using the executed communication program at operation S203 in FIG. 6.

If the transmitted web page is the pre-set web page, operation S105 is performed as shown in FIG. 6 and normal communications are performed. If the transmitted web page is not the pre-set web page, operation S104 is performed as shown in FIG. 6 and the communication unit 110 is shut off. According to another embodiment of operation S103, operation S203 that has already been described with respect to FIG. 6 may be performed as shown in FIG. 5.

If operation S104 of FIG. 4, 5, or 6 is performed, the controller 120 determines whether to end the process at operation S106. The controller 120 performs operation S102 if the process is to be continued, or ends the process if the operation is not to be continued.

The present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Aspects of the present invention provide a computer system and control method thereof that can prevent the consumption of power due to the communication operation and can improve user convenience by shutting off the communication operation if the pre-set communication program or the pre-set web page is not found.

Aspects of the present invention also provide a computer system and control method thereof where damage to the components can be prevented because the physical connection or disconnection of a network cable is not required, and the consumption of power due to the communication operation is automatically decreased according to whether the communication operation is necessary or not.

Aspects of the present invention also provide a computer system and control method thereof that can satisfy the user's preference by determining whether to decrease the consumption of power due to the communication operation based on the user's setting.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system comprising:
   a communication unit to receive power to perform communication with an external apparatus;
   a user input unit to receive a user's command with regard to setting a pre-set program; and
   a controller to check whether at least one program to make the communication unit perform the communication is executing, and to control the communication unit to decrease consumption of power by the communication unit if the executing program is not the pre-set program,
   wherein the controller determines whether the executing program is the pre-set program according to the user's command.

2. The computer system according to claim 1, wherein the controller decreases the consumption of the power by shutting off a supply of power to the communication unit.

3. The computer system according to claim 1, wherein the controller decreases the consumption of the operating electric power by controlling the communication unit to stop the communication.

4. The computer system according to claim 1 further comprising:
   a displaying unit to display a graphical user interface (GUI) with regard to the setting of the program;
   wherein the controller controls the displaying unit to display at least one item corresponding to at least one program and a select box to select one of the at least one programs according to the user's command on the GUI.

5. The computer system according to claim 1, further comprising:
   a battery unit to supply the power to the communication unit.

6. The computer system according to claim 1, wherein the controller controls the communication unit to decrease the consumption of the power by the communication unit if the at least one program is not executing.

7. A control method of a computer system comprising a communication unit to receives power to perform communication with an external apparatus, the control method comprising:
   checking whether at least one program to make the communication unit perform the communication is executing based on a pre-set program;

determining whether the executing program is the pre-set program by receiving a user's command with regard to setting the pre-set program; and controlling the communication unit to decrease consumption of the power by the communication unit if the executing program is not the pre-set program.

8. The control method of the computer system according to claim 7, wherein the controlling of the communication unit comprises decreasing the consumption of the power by shutting off a supply of power to the communication unit.

9. The control method of the computer system according to claim 7, wherein the controlling of the communication unit comprises decreasing the consumption of the power by controlling the communication unit to stop communication.

10. The control method of the computer system according to claim 7, wherein the determining of the pre-set program comprises:

displaying a graphical user interface (GUI) having at least one item corresponding to at least one program and a select box to select one of the at least one program the program as the pre-set program according to the user's command.

11. The control method of the computer system according to claim 7, further comprising:

supplying the power to the communication unit via a battery unit.

12. The control method of the computer system according to claim 7, wherein the controlling of the communication unit comprises controlling the communication unit to decrease the consumption of the power by the communication unit if the at least one program is not executing.

13. A computer system comprising:

a communication unit to receive power to perform communication with an external apparatus;

a user input unit to receive a user's command with regard to setting a pre-set web page; and a controller to check whether at least one web page is transmitted according to the communication performed by the communication unit, and to control the communication unit to decrease consumption of the power by the communication unit if the transmitted web page is not the pre-set web page, wherein the controller determines whether the executing web page is the pre-set web page according to the user's command.

14. The computer system according to claim 13, further comprising:

a displaying unit to display a graphical user interface (GUI) with regard to the setting of the web page;

wherein the controller controls the displaying unit to display at least one item corresponding to at least one web page and a select box to select one of the at least one web pages according to the user's command on the GUI.

15. A control method of a computer system comprising a communication unit to receive power to perform communication with an external apparatus, the control method comprising:

checking whether at least one web page is transmitted according to a communication performed by the communication unit based on a pre-set web page;

determining whether the transmitted web page is the pre-set web page by receiving a user's command with regard to setting the pre-set web page; and controlling the communication unit to decrease consumption of the power by the communication unit if the transmitted web page is not the pre-set web page.

16. The control method according to claim 15, further comprising:

displaying a graphical user interface (GUI) for setting of the web page by the user; and displaying at least one item corresponding to at least one web page and a select box to select one of the at least one web pages according to the user's command on the GUI.

17. A method of controlling power consumption of a communication unit, the method comprising:

determining if a pre-set communication program is executing and/or a pre-set web page is being accessed;

determining whether the executing program and/or the accessed web page is the pre-set program and/or web page by receiving a user's command with regard to setting the pre-set program and/or web page; and decreasing the supply of power to a communication unit if the pre-set communication program is not executing or the pre-set web page is not being accessed.

18. The method of claim 17, wherein the decreasing of the supply of power comprises shutting off the supply of power to the communication unit.

19. The method of claim 17, wherein the decreasing of the supply of power comprises:

terminating any programs currently executing that are not the pre-set communication program; and terminating the access of any web page that is not the pre-set web page.

20. The method of claim 17 further comprising:

displaying a graphical user interface (GUI) for setting of the communication program and/or web page; and displaying at least one item corresponding to at least one communication program and/or web page and a select box to select one of the at least one communication programs and/or web pages according to the user's command on the GUI.

* * * * *